US012229279B1

(12) United States Patent
Matrosov et al.

(10) Patent No.: US 12,229,279 B1
(45) Date of Patent: *Feb. 18, 2025

(54) CRYPTOGRAPHY BILL OF MATERIALS (CBOM) GENERATION FROM BINARY EXECUTABLES

(71) Applicant: Binarly Inc, Santa Monica, CA (US)

(72) Inventors: Alexander Matrosov, Santa Monica, CA (US); Sam Lloyd Thomas, Birmingham (GB); Yegor Vasilenko, Cambridge (GB)

(73) Assignee: Binarly Inc, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/927,703

(22) Filed: Oct. 25, 2024

Related U.S. Application Data

(63) Continuation of application No. 18/791,301, filed on Jul. 31, 2024, now Pat. No. 12,153,686.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 2006/0277539 A1* | 12/2006 | Amarasinghe | G06F 21/54 717/168 |
| 2019/0317756 A1* | 10/2019 | Bough | G06F 8/71 |
| 2021/0232695 A1* | 7/2021 | Eldefrawy | G06F 21/602 |
| 2023/0208880 A1* | 6/2023 | Schutt | G06F 21/566 726/1 |

\* cited by examiner

*Primary Examiner* — Fatoumata Traore
(74) *Attorney, Agent, or Firm* — Jones Day

(57) ABSTRACT

A software package is received so that functions within the software package that implement or use cryptographic primitives can be identified. Further, a set of calls with each of the identified functions are determined. A call site analysis is performed based on the set of calls to determine cryptographic algorithm parameters. Thereafter, based on the set of calls and the call site analysis, a cryptography bill of materials (CBOM) detailing cryptographic primitives within the software package is generated. This CBOM can be provided to a consuming application or process. Related apparatus, systems, techniques and articles are also described.

20 Claims, 9 Drawing Sheets

CRYPTOGRAPHY BILL OF MATERIALS (CBOM) GENERATION FROM BINARY EXECUTABLES

RELATED APPLICATION

The current application claims priority to U.S. patent application Ser. No. 18/791,301 filed on Jul. 31, 2024, the contents of which are hereby fully incorporated by reference.

TECHNICAL FIELD

The subject matter described herein relates to a combination of program analysis and machine learning-based techniques for identifying cryptographic primitives within software packages which may cause a computing system to exhibit undesired behavior or security weaknesses.

BACKGROUND

A Software Bill of Materials (SBOM) describes software ingredients/dependencies from third-party software to track risks across all software assets, including dependencies.

A Cryptography Bill of Materials (CBOM) describes cryptographic assets and their dependencies. Discovering, managing, and reporting on cryptographic assets is an important component for the migration journey to quantum-safe systems and applications. Cryptography is typically buried deep within software components used to compose and build systems and applications. As part of an agile cryptographic approach, organizations should seek to understand what cryptographic assets they are using and facilitate the assessment of the risk posture to provide a starting point for mitigation.

SUMMARY

In a first aspect, a software package is received which comprises code. Functions are identified within the software package that implement or use cryptographic primitives. Further, a set of calls with each of the identified functions are determined. A call site analysis is performed based on the set of calls to determine cryptographic algorithm parameters. Thereafter, based on the set of calls and the call site analysis, a cryptography bill of materials (CBOM) detailing cryptographic primitives within the software package is generated. This CBOM can be provided to a consuming application or process.

The identification of functions can include conducting a similarity analysis to identify statically linked cryptographic library functions in the code and/or performing a cross-reference analysis to identify unique cryptographic primitives in the code and/or detect statically linked cryptographic library functions.

A call graph can be generated which characterizes relationships amongst different functions in the code. The code relations on the call graph to identified in order to collect all locations at which cryptographic code is used or called from.

The identification of functions can include, in some variations, analyzing protocol globally unique identifiers (GUIDs) indicative of cryptography-related Unified Extensible Firmware Interface (UEFI) protocols.

The identification of functions can include analyzing import sections of the code to identify dynamically linked functions.

In some variations, the identification of functions can include generating an intermediate representation for each function, generating, for each intermediate representation, an embedding, extracting, for each function, features from both of the corresponding intermediate representation and the embedding, and inputting, for each function, the corresponding extracted features into a machine learning model trained and configured to identify functions or components comprising cryptographic primitives.

The dynamically linked functions can be identified by way of indirect calls from exported functions to a third-party library which is dynamically linked during runtime.

The algorithm parameters can include one or more of cipher modes, key sizes, parameter encoding, and parameter decoding.

The call site analysis can include generating a control flow graph and performing control flow analysis on the control flow graph to identify specific modes of operation of a cipher.

The call site analysis can include emulating at least a portion of the code to identify specific modes of operation of a cipher.

The call site analysis can include emulating at least a portion of the code to reconstruct the cryptographic algorithm parameters.

One or more remediation actions can be initiated based on the CBOM (for example, by the consuming application or process). The remediation actions can take various forms including blocking access to some or all of the software package (e.g., software package as a whole or specific components, etc.). The remediation actions can also include flagging one or more components within the software package as comprising cryptographic primitives.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides machine learning-based techniques for more precisely and rapidly identifying software supply chain security risks such as cryptographic primitives in software packages without having access to source code.

The details of one or more variations of the subject matter described herein are set forth in the accompanying drawings and the description below. Other features and advantages of the subject matter described herein will be apparent from the description and drawings, and from the claims.

DETAILED DESCRIPTION

The subject matter described herein relates to machine learning-based techniques for identifying cryptographic primitives in software packages which may cause a computing system to exhibit undesired behavior. Cryptographic primitives, in this context, are low-level cryptographic algorithms that are frequently used to build cryptographic protocols for computer security systems. The current cryptography identification techniques can be used in a standalone fashion to generate a CBOM. In other cases, the current subject matter can be used in combination with techniques for identifying components of a software package (e.g., generate an SBOM) such as described in U.S. patent application Ser. No. 18/639,784 entitled: "Machine Learning-Based Approach to Characterize Software Supply Chain Risk" and U.S. patent application Ser. No. 18/639,805 entitled: "Machine Learning-Based Approach to Identify Software Components", the contents of both of which are hereby fully incorporated by reference.

Figure 1:
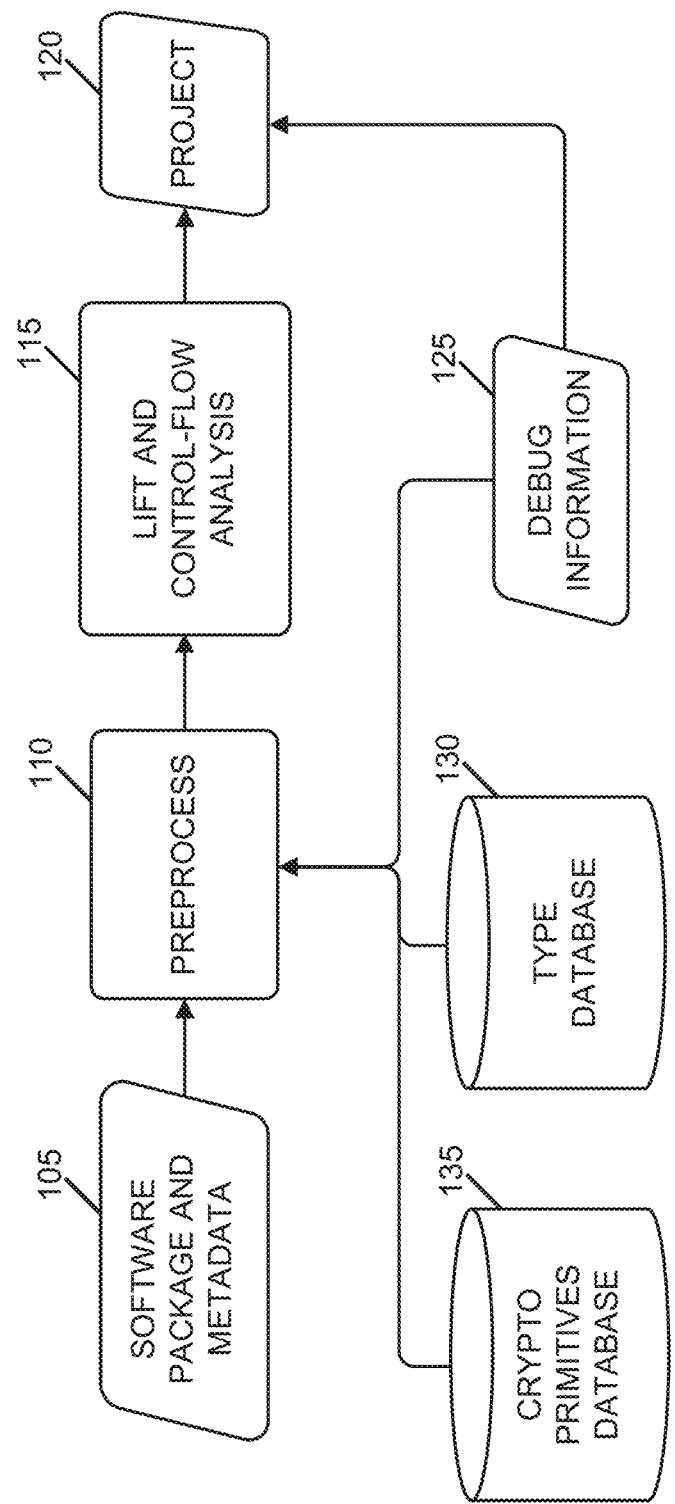
FIG. 1 is a diagram illustrating a process for characterizing the contents of a software package.

FIG. 1 is a diagram 100 directed to the processing and analysis of a software package. Software packages, in this context unless otherwise specified, can comprise executables, binaries, and libraries and generally can provide coordinated functionality. Initially, at 105, a software package and associated metadata is accessed or otherwise received. This software package contains a plurality of components which need to be identified or otherwise analyzed for the assessment of security vulnerabilities. A software component can be characterized as a unit of composition with contractually specified interfaces and explicit context dependencies only. Components can take varying forms such as a views, models, controllers, data access objects, services, plugins, APIs or other modules that encapsulate a set of related functions or data. Components can communicate (e.g., through function calls, etc.) with each other via corresponding interfaces.

The metadata can provide context for the software package (and its contents) including information about component creation, structure, purpose, and dependencies. The metadata can form part of the software package or comprise a separate file or series of files. The software package and metadata can be preprocessed, at 110, which can include unpacking/parsing the software package into the plurality of components so that they may be separately analyzed. The metadata for individual components can, in some cases, be updated to include complementary information from a cryptographic primitives database 135, a type database 130 and/or a debugging database 125 which results in an annotated component. Metadata can include provide additional contextual information regarding software package components, such as the vendor, meaning of the component, dependencies on third-party code, and more. Further, in some variations, metadata can characterize any cryptographic assets forming part of the software package such as cryptographic primitives and the like.

The cryptographic primitives database 135 can store sematic code properties for cryptographic primitives for use with identification and classification of cryptographic assets within a software package. The type database 130 can be a database such as a key-value NoSQL or graph database that stores information regarding complex types like C/C++ structures or objects. The debugging database 125 can provide alerts or fixes for known bugs associated with the particular component at the function or other level.

As used herein, the component can be at the root level with all components being rooted to the software package. The software package is the root for every component. Components are a topic of analysis and the associated data is contextualized at the software package level.

Once the component has been further contextualized, the annotated component at 115, can be lifted into an immediate representation (IR) so that a control flow analysis can be performed (i.e., a control flow graph (CFG) can be generated which defines an order of execution of functions forming part of a component, etc.). IR is the data structure or code used by a compiler or virtual machine to represent the corresponding low-level machine instructions and which can represent the operational semantics of the corresponding code. The IR may be in an intermediate language (not assembly code, etc.) which is configured for code analyses such as determining the control flow in which individual statements, instructions or function calls of a component within the software package are executed or evaluated. The control flow analysis can be performed using an IR topology extractor which reconstructs a control flow graph and a data flow graph during the lifting phase. In particular, the lifting and control-flow extraction can be used to identify functions as well as their basic block bounds and their connectivity. The results of the lifting and control-flow extraction are used to populate a project 120 which can be a hierarchical representation of the software package analysis. The project can be characterized as an aggregator of software packages. For example, the project could be associated with a specific device type or software product and aggregate multiple builds (recompilations) or different versions of the same software packages to provide a better way of contextualization and search for the results associated with a specific entity. The information about the software package components in the project 120 can be further enriched with information from the debugging database 125 such as the application of symbol information to provide function names.

Figure 2:
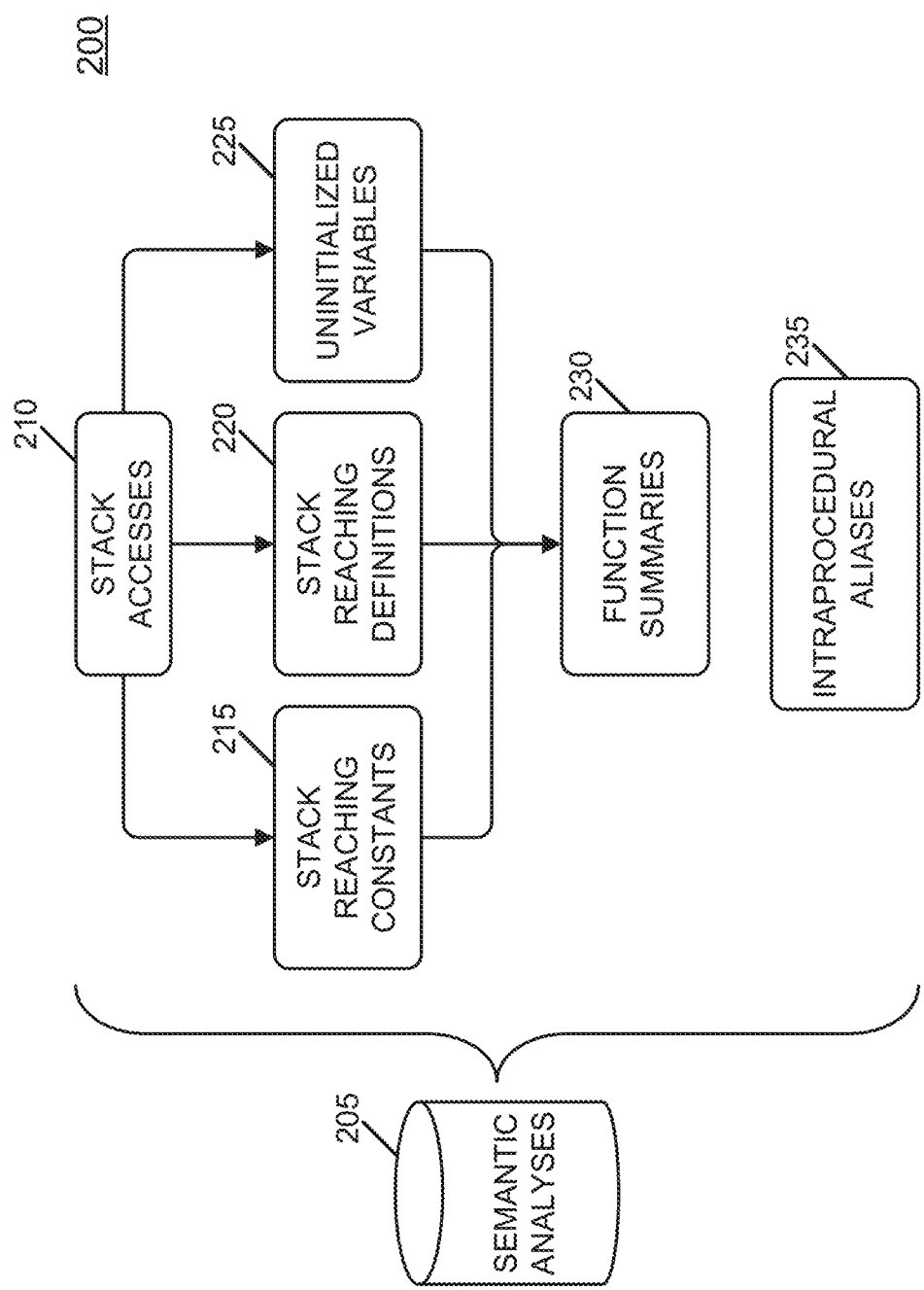
FIG. 2 is a diagram for characterizing functions utilized by components of a software package.

FIG. 2 is a diagram 200 illustrating different aspects that can be used to define the semantics of the software package which can be stored within a semantic analysis database 205 which characterizes the data flows through different functions (which differs from the control flow analysis). Using the IR of a software package, at 210, attributes associated with data flows through different functions (e.g., stack accesses for each function forming part of the software package, etc.) can be characterized. These attributes can include, at 215, whether there is a constant static variable on the stack. Such context provides additional details of the code semantics for the analysis and can, additionally, be beneficial for static analysis. The attributes can also include, at 220, the stack reaching definitions (i.e., particular place in a program/code and/or the point at which the variable gets killed or defined as a different variable). In addition, the attributes can include, at 225, whether there are any uninitialized variables. Uninitialized variables can have indeterminate values, which for objects of some types, result in undesired behavior (e.g., malicious activity, etc.). These different attributes can be used, at 230, to generate behavioral summaries for each function. In addition, the semantic analyses 205 can also include information characterizing intraprocedural aliases 235 which can identify alias information from different, intersecting execution paths which can be helpful as part of the overall analysis of the software package.

Figure 3:
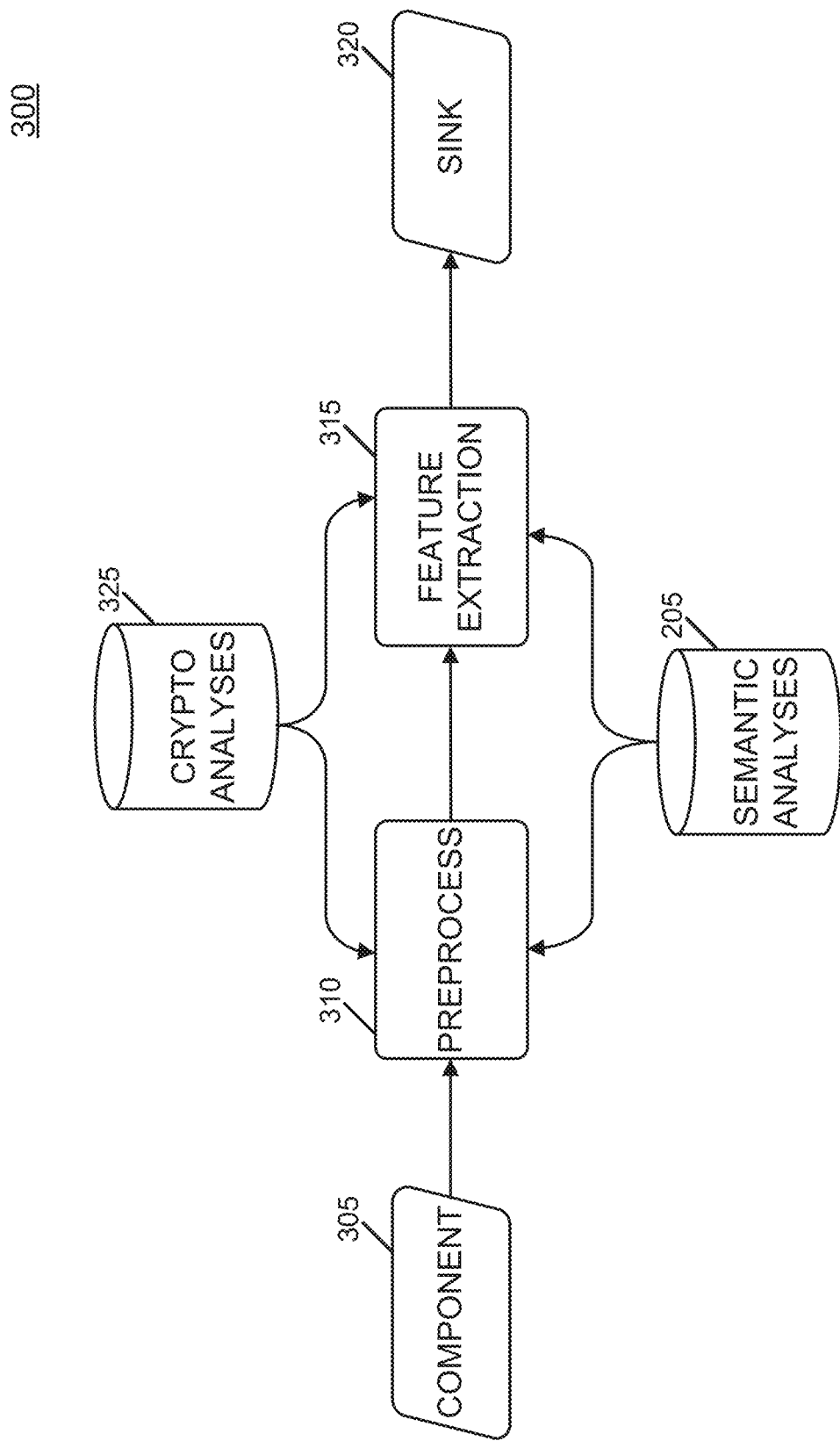
FIG. 3 is a diagram illustrating a workflow for preprocessing components and for feature extraction therefrom.

The semantic analyses 205 can be used as part of a workflow illustrated in the diagram 300 of FIG. 3. Each component 305 is preprocessed at 310 to result in an annotated component which includes additional contextual information about the encapsulated or otherwise utilized functions based on information stored in the semantic analyses database 205. The preprocessing can leverage the semantic analysis 205 and/or cryptographic primitives analyses 325. Other preprocessing operations can be performed to allow, at 315, features to be extracted such as coding attributes that describe the code semantics, such as pointers, complex types, and the like for training various machine learning model. These features can be or be derived from attributes of the component 305 which characterize software supply chain risk (i.e., the likelihood of a vulnerability being encapsulated within the software package, etc.). The extracted features can additionally include information from or derived from the semantic analyses 250 and/or the cryptographic primitive analyses 325. The extracted features can, by way of an intermediate sink 320, be consumed by one or more processes and applications (e.g., machine learning models (as described in further detail below), etc.).

Figure 4:
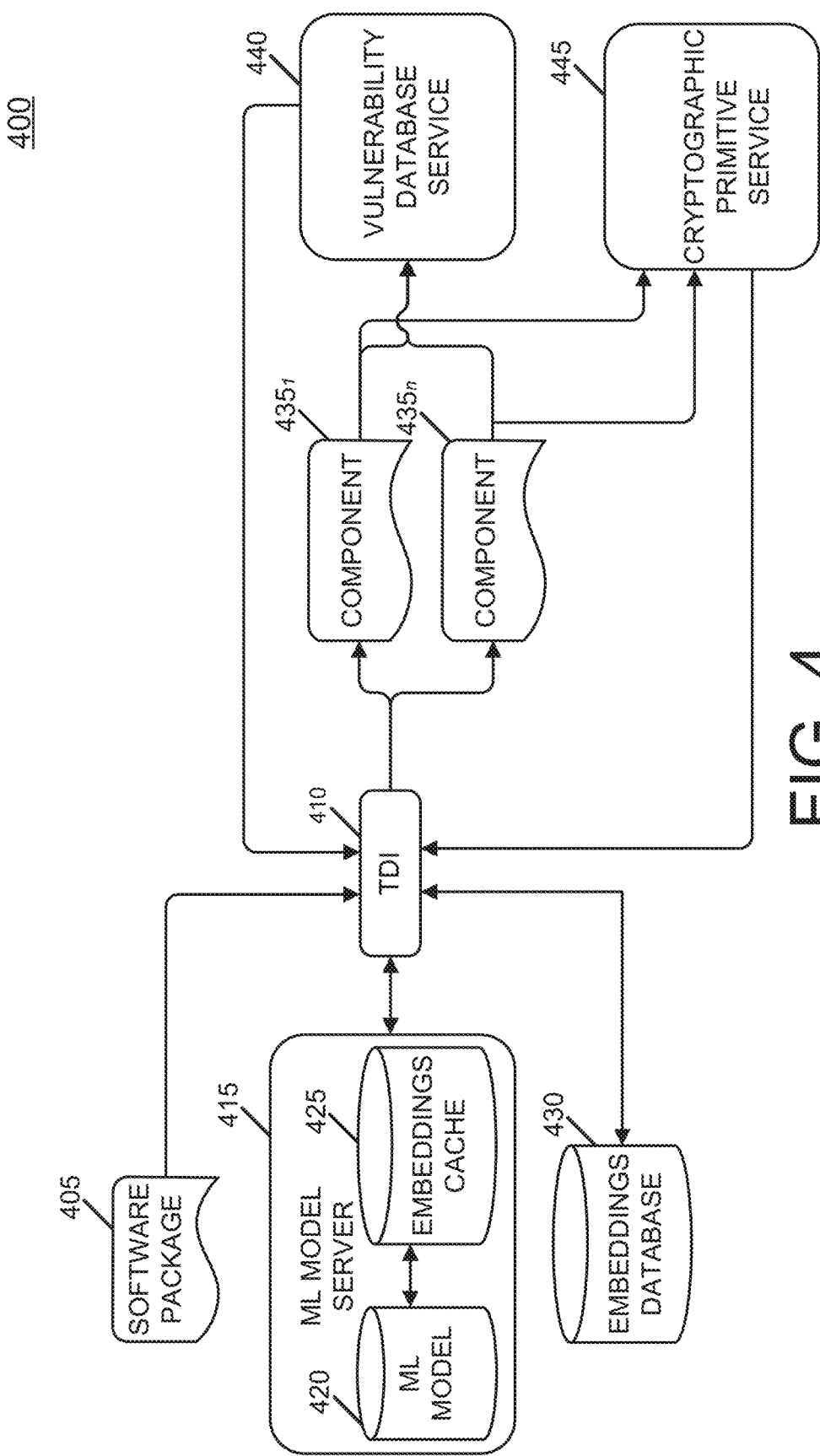
FIG. 4 is a diagram illustrating a workflow for identifying components within a software package using machine learning as part of a vulnerability analysis.

FIG. 4 is a diagram 400 illustrating a process in which a software package 405 is iteratively analyzed by a transitive dependency identifier (TDI) 410. For each component $435_{1 \ldots N}$ in the software package 405, the IRs for each function within such component can be analyzed. The TDI can leverage a machine learning model server 415 to help identify the components $435_{1 \ldots N}$ in the software package 405. The machine learning model server 415 can take different forms and can execute one or more machine learning models 420. The machine learning models 420 can take various forms and comprise an ensemble of models executing in sequence and/or in parallel. Example machine learning models 420 can include. These machine learning models can be trained, using, for example, a data set that characterizes decomposed software packages with the relations of components and functions inside each component. The resulting graphs used in the dataset corresponds with code semantics and data type relations to train the one or more machine learning models 420 to recognize not just a sequence of bytes but the code. The one or more machine learning models 420 can be trained using various training techniques including supervised, semi-supervised, and/or an unsupervised training techniques. In some cases, a lower dimensional representation of the function's IR representation can be used by the machine learning model 420. In some cases, this lower dimensionality can be an embedding generated through (give example embedding techniques) which can be stored in an embeddings cache 425 after being generated. The machine learning model server 415 can return information identifying each component $435_{1 \ldots N}$ in the software package 405 such as vendor, product name/ID, and version.

In some cases, the TDI 410 can generate an embedding of the IR of a function which is used to poll, using the embedding, an embeddings database 430 to see if the component has already been identified. The embeddings database 430 can store embeddings of a plurality of functions mapped to the same software component. In such cases, the embeddings database 430 can return information identifying or otherwise characterizing the component (e.g. vendor, product name/ID, version, etc.) to the TDI 410. The TDI 410 after identifying the components $435_{1 \ldots N}$ can poll a vulnerability database service 440 which can then return any known vulnerabilities for each component. These known vulnerabilities can be used to generate one or more reports. In some cases, these vulnerabilities are used to generate a supply chain risk score for the corresponding component and/or for the software package as a whole. In addition or in the alternative, the TDI 410 can also poll a cryptographic primitive service 445 to identify known functions or other primitives for a particularly identified component $435_{1 \ldots N}$, that contain cryptographic primitives. The cryptographic primitive service 445 can also specify the particular cryptographic primitives being used by particular functions or components $435_{1 \ldots N}$.

The machine learning model 420 can take various forms including: including one or all of: (i) a graph embedding model (e.g., node2vec, deepwalk, etc.); (ii) an IR to Vector (IR2V) model built with fastText classification algorithm in which input from each function's IR is normalized and tokenized; (iii) a recurrent neural network (RNN) which can, for example, be trained using a Siamese network with triplet loss in which input from each function's IR is normalized and tokenized. The aforementioned machine learning models 420 can be configured to be responsible for different part of the detection pipeline. As an example, one machine learning model 420 can detect malicious code changes, another machine learning model 420 can be focused on classification, a third machine learning model 420 can make an actional response based on previous context.

In some cases, the machine learning model 420 can be a code semantics/similarity model and take various forms including: RNN, Bi-RNN, transformer-based model architectures trained with triplet loss as part of a Siamese network. The Siamese network can contains the final network used to generate embeddings. Once training is finished, the RNN/Bi-RNN/transformer part can form the final version of the machine learning model 420.

Graph similarity models as used herein can take various forms so long as they provide the basis to produce a graph embedding such as node2vec, and DeepWalk.

An IR to vector embedding model as used herein can take various forms such as: FastText, Word2Vec-like models adapted to take IR as input (rather than text).

The machine learning model 420 can be trained using a dataset such as one based on EDK2 versions compiled with a different Microsoft Visual C++ (MSVC) and GNU Compiler Collection (GCC) versions as well as optimization levels for three processor architectures ARM, x86, x86-64. Within the training dataset, each function's IR (i.e., an expression static single-assessment (SSA) form IR) is extracted and function triplets are built (anchor, positive sample, negative sample) to train the machine learning model 420 (e.g., the RNN, etc.). Such an arrangement preserves the code semantic properties of the exemplars forming part of the training set.

Figure 5:
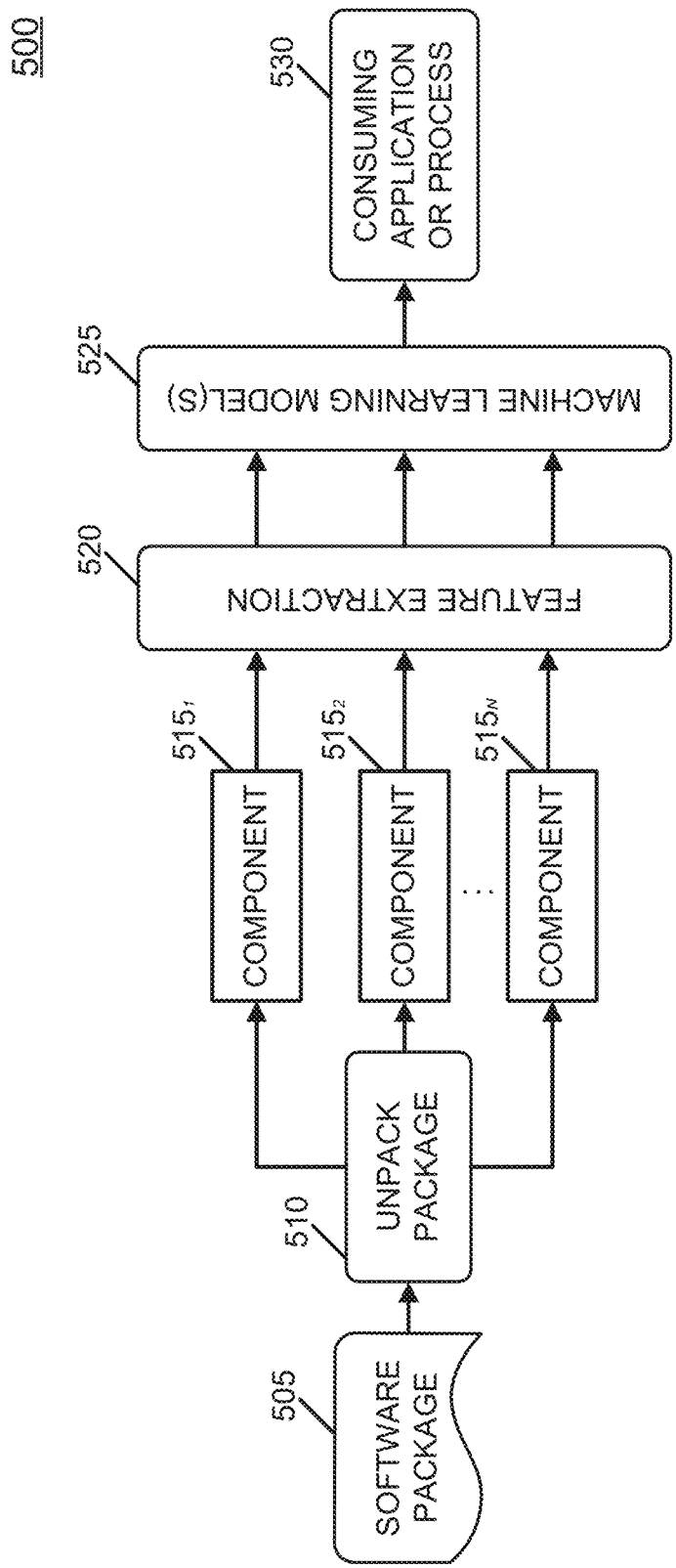
FIG. 5 is a first process flow diagram for identifying anomalous software packages or components therein using machine learning.

FIG. 5 is a first process flow diagram 500 in which machine learning is used to characterize a software package (e.g., provide vulnerability information, publisher information, version, applicable license, identify cryptographic primitives, etc.). A software package 505 is received or otherwise accessed so that, at 510, it can be unpacked (e.g., decomposed, etc.) into the components $515_{1 \ldots N}$ contained therein. Unpacking can include reversing the applicable compression algorithm used to originally compress firmware code to allow for the parsing of the software package 505 so that software components can be extracted. From these components, at 520, various features can be extracted and optionally vectorized. These features can include various aspects relating to supply chain (and thus supply chain risk such as identity and provenance of components, etc.) including, as an example, attributes which characterize the data flow graph and control flow graph connecting the function calls specific order or data usage. The extracted features can additionally or alternatively characterize behavioral attributes such as a purpose of specific API calls from the operation system or firmware. Further, the extracted features can additionally or alternatively relate to aspects of the component $515_{1 \ldots N}$ which can be used to identify or otherwise characterize cryptographic primitives therein.

The extracted features are input (either directly or after further processing) into a machine learning model 525. In some variations, an ensemble of machine learning models can be used. In some variations, a multi-class classifier can be used. The machine learning model 525 can be trained to infer, based on the extracted features, a level of supply chain risk is associated with the corresponding component $515_{1 \ldots N}$. The machine learning model 525 can be one or more of the models described above for machine learning model 420 and, in some cases, trained in a similar fashion.

The output of the machine learning model 525 can be provided, at 530, to a consuming application or process. The consuming application or process 530 can, for example, use the output to generate an overall supply chain risk score for the software package 510. In some cases, an overall supply chain risk score is generated by the machine learning model 525 (which is sent to the consuming application or process 530). In other variations, the consuming application or process 530 can, for example, use the output to generate a CBOM for the software package 510.

In some cases, the machine learning model 525 can be a multi-class classifier or an ensemble which is configured to score each of a plurality of different risk categories. An example multi-class classifier can work with direct IR, SSA and can provide for DFG and CFG detection and classification. For example, a first category can be an open-source software control category which characterizes risks of changes introduced by new versions. A second category can be a vulnerability category which characterizes security risks in components. A third category can be a license category which characterizes risks associated with the compliance of intellectual property (IP) legal requirements. A fourth category can be a development category which characterizes risks of compatibility between a pre-defined (e.g., existing) codebase and open-source software. A fifth category can be a support category which characterizes risks associated with older or obsolete software components. A sixth category can categorize cryptographic primitives within the components. Different category types can be utilized depending on the particular risks being considered/ analyzed for a software package. The risk scores and/or CBOM can be conveyed to a user in a graphical user interface, stored locally, loaded into memory, and/or transmitted over a network to a remote computing system.

The consuming application or process 530 can utilize the output of the machine learning model 525 to take further actions which can include, generating reports (e.g., populating a security/vulnerability dashboard interface, generating or annotating a software bill of materials, generating or annotating a cryptography bill of materials, etc.), taking remedial actions such as segregating a component $515_{1 \ldots N}$, and/or the software package 505. The scores can be used to characterize a potential security impact, and based on the impact classification, other types of remediation actions can be undertaken as provided in, for example, a knowledge base.

Figure 6:
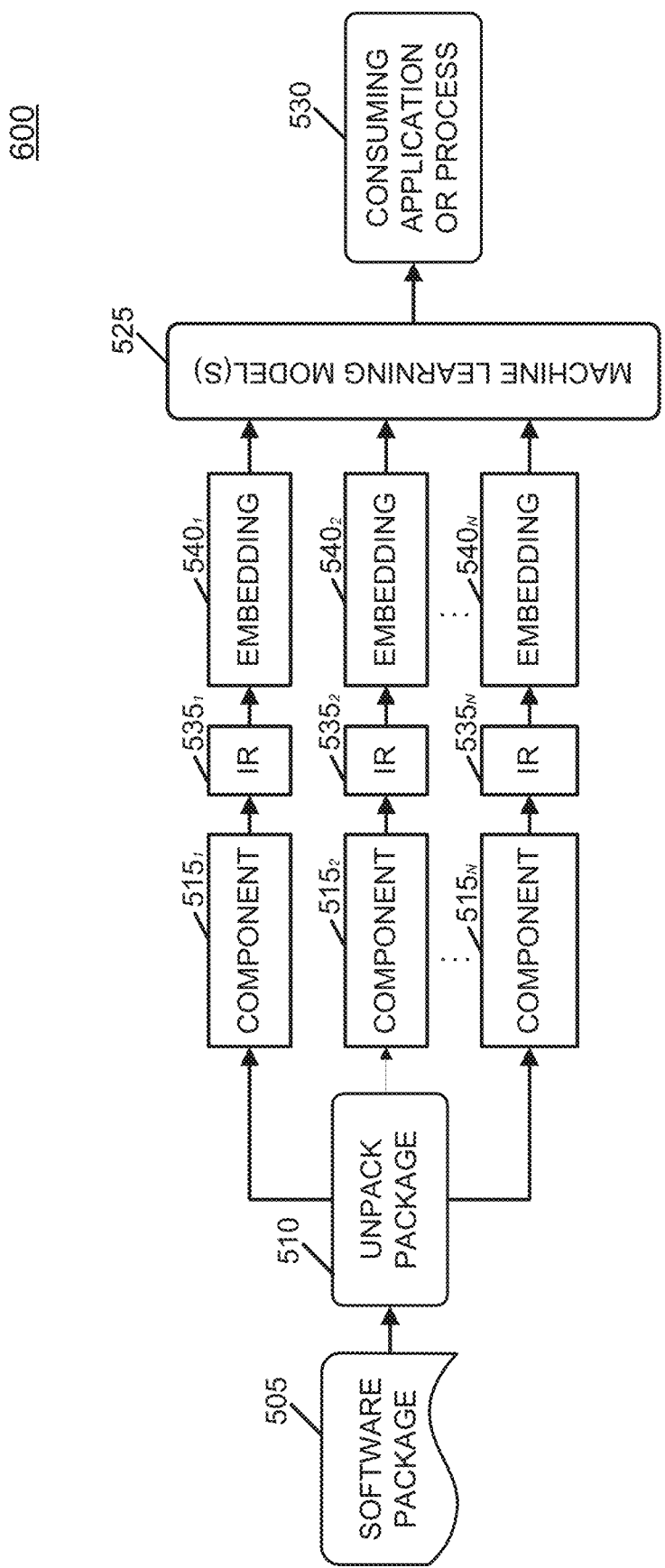
FIG. 6 is a second process flow diagram for identifying anomalous software packages or components therein using machine learning.

FIG. 6 is a diagram 600 illustrating a variation of FIG. 5 in which the software package 505 is also unpacked, at 510, into a plurality of components $515_{1 \ldots N}$. Unlike the example in FIG. 5, the functions of each of the components $515_{1 \ldots N}$ are lifted into a respective immediate representation (IR) $535_{1 \ldots N}$. Various techniques can be used for lifting the components $515_{1 \ldots N}$ into the IRs $535_{1 \ldots N}$ including those described above. As an example, static binary translation techniques can be utilized that translate machine code instructions into IR. To lift the code to IR on the first step is to decode the machine code bytes to IR instruction. This decoding step takes raw instruction bytes, and turns them into a higher-level IR instruction. These IRs $535_{1 \ldots N}$ are then used to generate embeddings $540_{1 \ldots N}$ through one or more dimensionality reduction processes. The embeddings $540_{1 \ldots N}$ can be generated using word embedding techniques which learn dense vector representations of words from IR data. The embedding process can include, as part of preprocessing, tokenizing the input and optionally performing other preprocessing. An embedding layer is generated by creating an embedding matrix to store learned word vectors after which such embedding matrix is randomly initiated with a specified dimensionality. These embeddings can be consumed by the machine learning model(s) 525 for supply chain risk scoring or other classifications such as component identity and/or component provenance. The machine learning model 525 can then provide its output (e.g., software package supply chain risk score, component-level supply chain risk scores, category scores at package or component level, etc.) to a consuming application or process 530.

Figure 7:
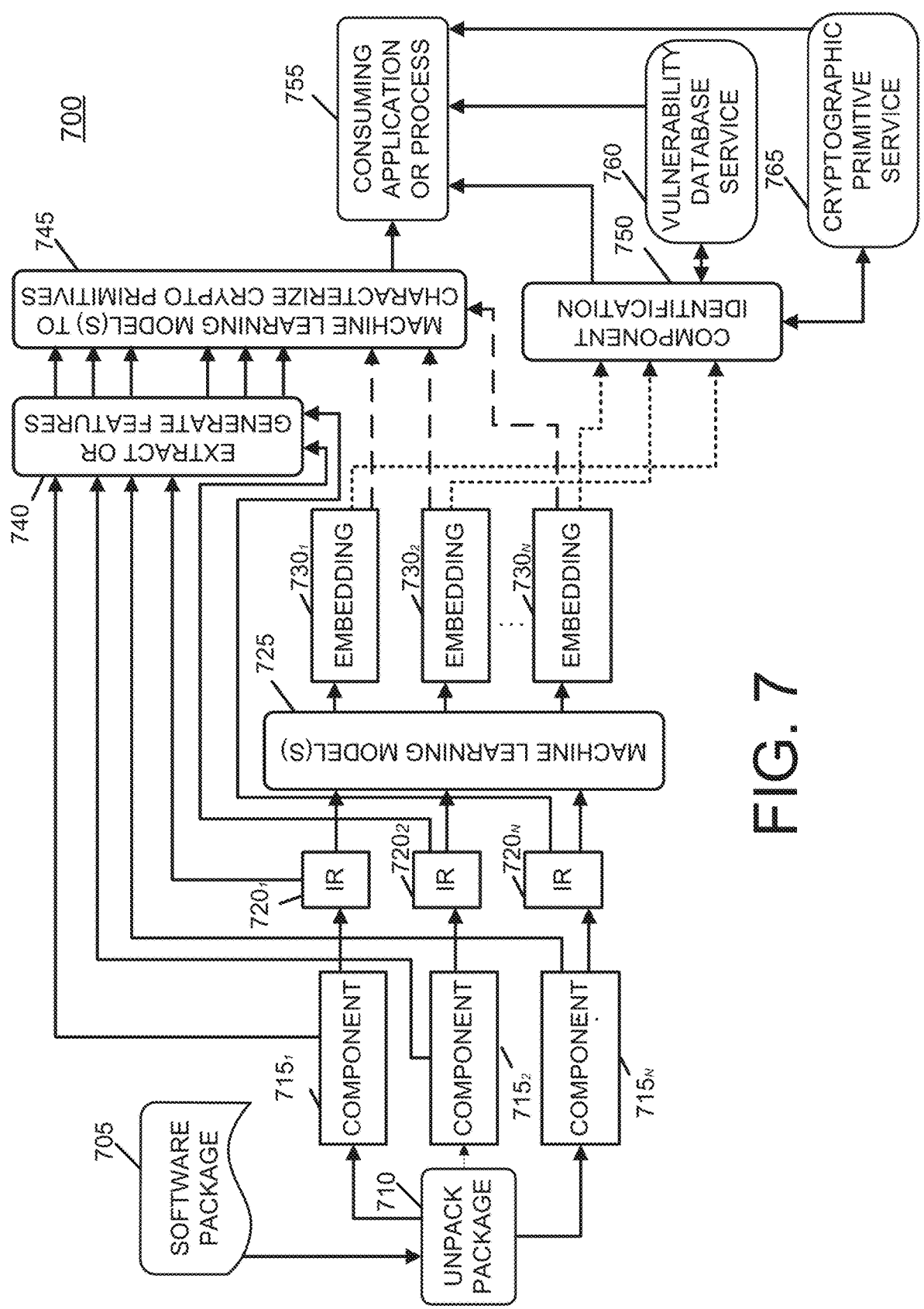
FIG. 7 is a third process flow diagram for identifying anomalous software packages or components therein using machine learning.

FIG. 7 is a diagram 700 illustrating a variation of FIG. 6 in which a software package 705 is also unpacked, at 710, into a plurality of components $715_{1 \ldots N}$. Similar to FIG. 6, the functions of each of the components $715_{1 \ldots N}$ are lifted into a respective immediate representation (IR) $720_{1 \ldots N}$. Various techniques can be used for lifting the components $715_{1 \ldots N}$ into the IRs $720_{1 \ldots N}$ including those described above. As an example, static binary translation techniques can be utilized that translate machine code instructions into IR. To lift the code to IR on the first step is to decode the machine code bytes to IR instruction. This decoding step takes raw instruction bytes, and turns them into a higher-level IR instruction.

These IRs $720_{1 \ldots N}$ are then inputted into one or more machine learning models 725 to generate embeddings $730_{1 \ldots N}$ through one or more dimensionality reduction processes. The one or more machine learning models 725 can take varying forms including those similar to those referenced above with regard to machine learning model 420. In some cases, there is an ensemble of machine learning models generating a plurality of embeddings for each IR $720_{1 \ldots N}$. The embeddings $730_{1 \ldots N}$ can be generated using word embedding techniques which learn dense vector representations of words from IR data. The embedding process can include, as part of preprocessing, tokenizing the input and optionally performing other preprocessing. An embedding layer is generated by creating an embedding matrix to store learned word vectors after which such embedding matrix is randomly initiated with a specified dimensionality.

These embeddings can be consumed by a component identification 750 module to identify the components $715_{1...N}$. The component identification module 750 can take various forms including machine learning-based identifications (based on training of such model with embeddings corresponding to known components) or distance-based similarity analyses (similar to those described above). In some variations, data characterizing the component identification 750 is sent directly to consuming application or process. Alternatively or in addition, a vulnerability database service 760 can be called to lookup any known risks associated with the identified components so that such information can be sent (either directly or by way of the component identification module 750) to a consuming application or process 755. Alternatively or in addition, a cryptographic primitive service 765 can be called to lookup any known cryptographic primitives withing the identified components so that such information can be sent (either directly or by way of the component identification module 750) to a consuming application or process 755.

In a different path in FIG. 7, features are extracted or generated, at 740 based on the components $715_{1...N}$ and the IRs $720_{1...N}$. These features, along with embeddings $730_{1...N}$ can be input into one or more machine learning models 745 (such as those described above in connection with machine learning model 420) which are configured and trained to characterize (e.g., identify, etc.) cryptographic primitives within a function, a component $715_{1...N}$, and/or the software package 710 as a whole. The one or more machine learning models 745 can comprise a multi-class classifier and/or an ensemble of models which can characterize different attributes (e.g., different risk categories) of the components $715_{1...N}$ or software package 705. The output of such one or more machine learning models 745 is provided to a consuming application or process 755.

Figure 8:
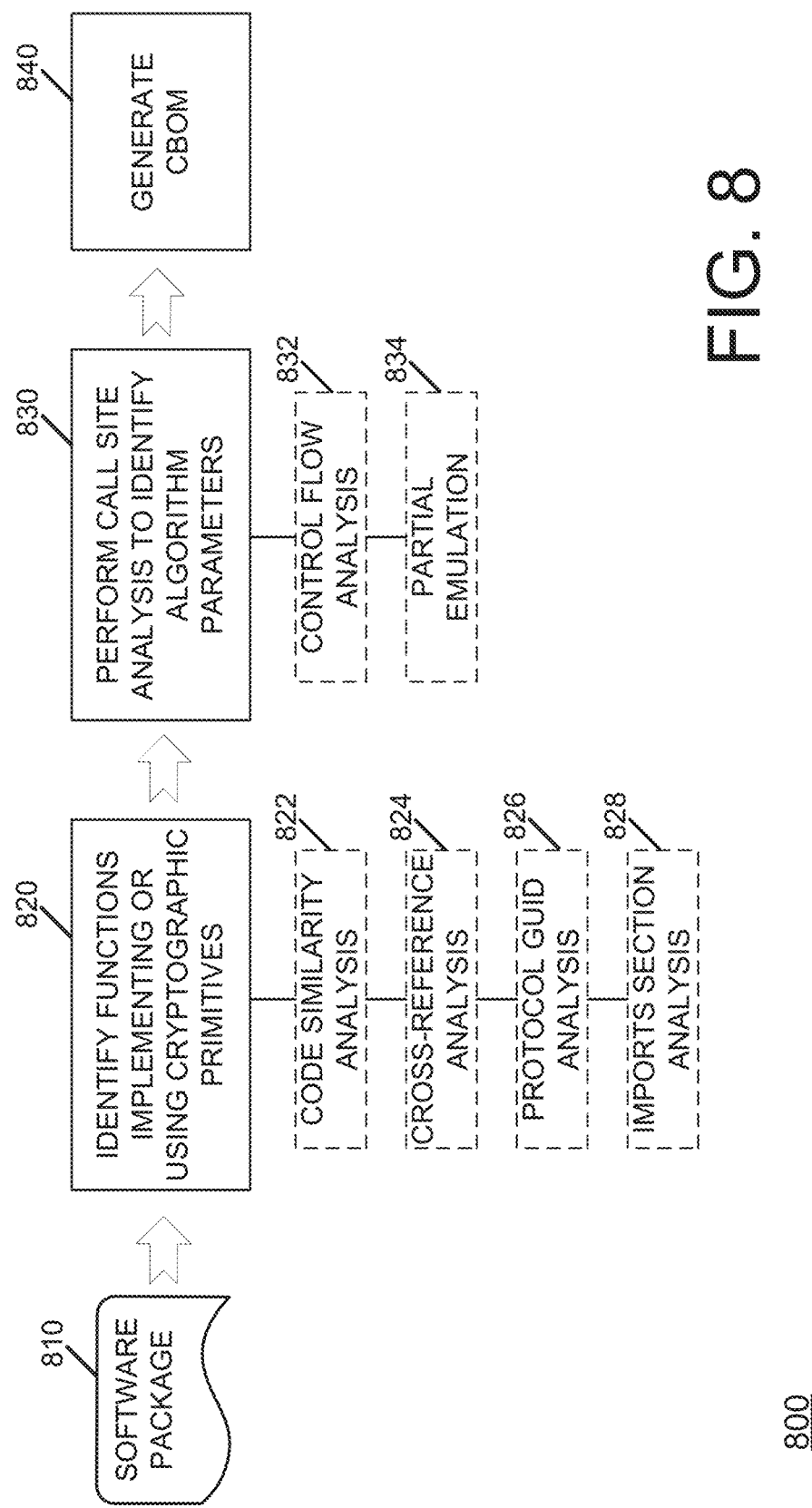
FIG. 8 is a diagram illustrating a workflow for generating a cryptography bill of materials.

With reference to diagram 800 of FIG. 8, a software package 810 is accessed (e.g., received, etc.) which may include cryptographic assets. The software package 810 is then analyzed using a two stage analysis in which, at 820, functions that implement or use any of the cryptographic primitives or algorithms are identified. Such cryptographic primitives can, for example, include statically linked and imported functions. Statically linked functions can include, for example, external libraries which are integrated during compile time. Imported functions can be dynamically loaded on demand (i.e., when the functions are needed). In addition, at 830, a call site analysis can be performed to identify cryptographic algorithm parameters. These cryptographic algorithm parameters can include, for example, cipher modes, key sizes, as well as other code characteristics indicative of specific implementations and security weaknesses.

Various operations can be performed as part of the identification of functions implementing or using cryptographic primitives at 820. As an example, at 822, a code similarity analysis can be conducted (such as described above). Such code similar analysis can be used to identify statically linked cryptographic library functions by comparing code in the software package 810 to code that is known to include statically linked cryptographic library functions.

Functions implementing or using cryptographic primitives 820 can additionally or alternatively be identified by performing, at 824, a cross-reference analysis to identify unique cryptographic primitives in the code or detect statically linked cryptographic library functions. A call graph characterizing relationships amongst different functions in the code can be generated and used as part of the cross-reference analysis. Code relations on the call graph can be identified in order to collect all locations at which cryptographic code is used or called from.

Functions implementing or using cryptographic primitives 820 can additionally or alternatively include, when analyzing a UEFI firmware-specific software package/target, performing, at 826, a protocol GUID analysis in which use of cryptography-related UEFI protocols are analyzed (similar to an exported function calls from a DLL library).

Functions implementing or using cryptographic primitives 820 can additionally or alternatively be identified by performing, at 828, an analysis the imports section of software package code (i.e., compiled code) to identify dynamically linked functions. This identification can be based on code-similarity and code-properties classification related to known cryptographic algorithms and ML-based embeddings. In particular, the identification can be based on indirect calls from exported functions to a third-party library which is dynamically linked at runtime.

The call site analysis, at 830, is a type of interprocedural analysis that identifies a function or subroutine-specific code location and where the function is called from/where. This call site analysis 830 can include various operations including, at 832, a control flow analysis which can be characterized as static code analysis technique for determining a program's control flow, which can be expressed as a control flow graph (CFG). The CFG can be generated in the manner described above from an intermediate representation of the corresponding component within the software package 810. The CFG can be used, as part of a control flow analysis to identify specific modes of operations of symmetric ciphers (i.e., a cipher that uses the same key for encryption and decryption such as AES, etc.). In this context, a mode of operation describes how to repeatedly apply a single-block cipher operation to securely transform amounts of data larger than a block. In addition or alternative to the control flow analysis, the call site analysis can utilize partial emulation to identify the specific modes of cipher operation. Partial emulation can be a simplified emulation workflow in which the code is emulated for specific cases such reconstruction of the stack or memory allocation, which usually requires code execution. This technique helps reconstruct the function call parameters, including the pointers and their semantic properties without executing the program. The partial emulation can also be used, at 834, to reconstruct algorithm parameters values which are defining cipher behavior.

Once the functions and algorithm parameters are identified, a cryptography bill of materials (CBOM) can be generated at 840. The CBOM can be used by one or more consuming applications or processes which can use the CBOM for informational purposes (e.g., identifying particular cryptographic assets for a security professional to assess, alerting, etc.) and/or it can be used for remediation purposes (e.g., preventing the software package 810 from being executed, accessed, transported, etc.). The CBOM can take various forms including an object model describing cryptographic assets within the software package 810 and their dependencies. The dependencies are of particular importance as cryptographic libraries do not necessarily reflect usage by the software package 810. Assets can include certificates and related cryptographic materials such as keys, tokens, secrets and/or passwords. The CBOM can also specify how the cryptographic assets relate to other components in the software package 810 such as applications, frameworks, libraries, containers, operating-systems, devices, firmware and files. The CBOM can, for example, be generated according to a pre-defined schema (e.g., .JSON schema).

Figure 9:
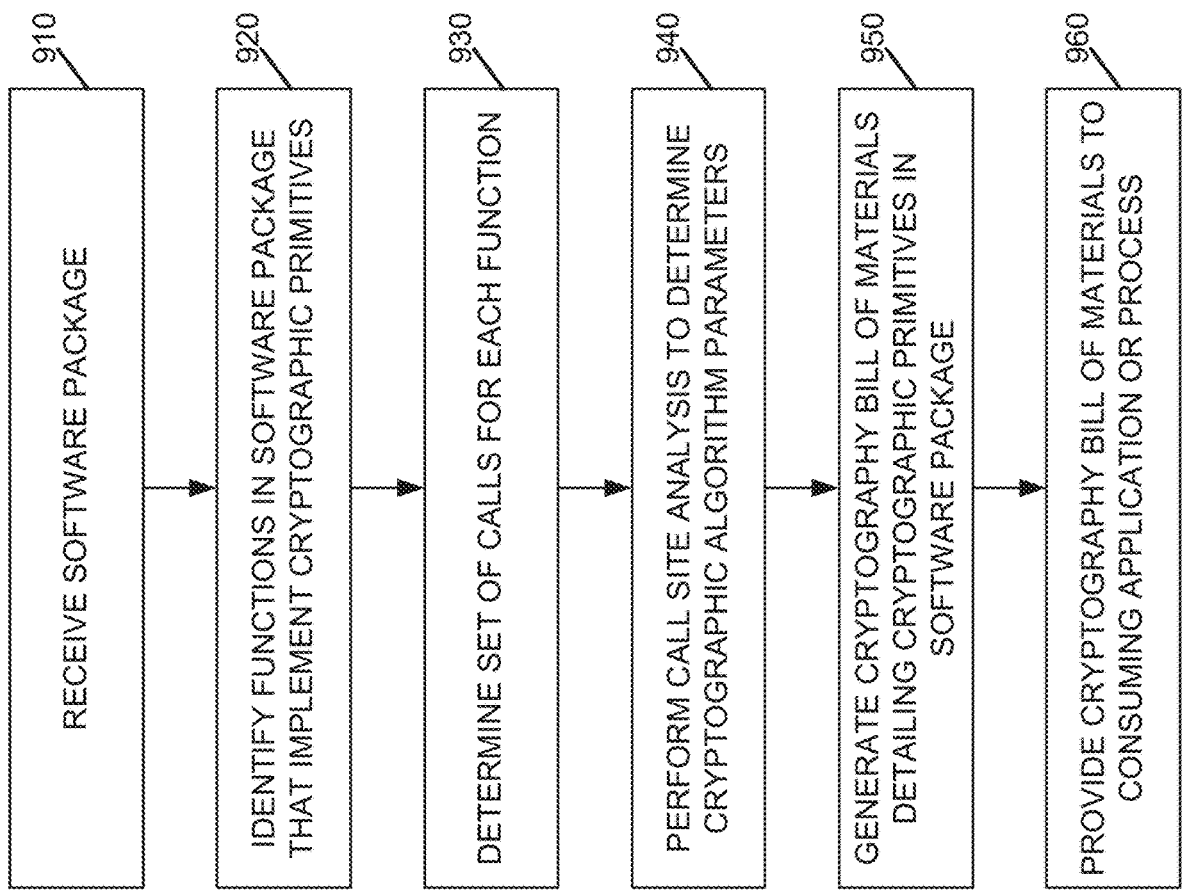
FIG. 9 a is a process flow diagram illustrating the generation of a cryptography bill of materials from a binary executable.

FIG. 9 is a process flow diagram 900 in which, at 910, a software package is received which comprises code. Functions are identified within the software package, at 920, that implement or use cryptographic primitives. Further, at 930, a set of calls with each of the identified functions are determined. A call site analysis is performed, at 940, which is based on the set of calls to determine cryptographic algorithm parameters. Thereafter, at 950, based on the set of calls and the call site analysis, a cryptography bill of materials (CBOM) detailing cryptographic primitives within the software package is generated. This CBOM can be provided, at 960, to a consuming application or process.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving a software package comprising code;
   identifying functions within the software package that implement or use cryptographic primitives by;
   generating an intermediate representation for each function;
   generating, for each intermediate representation, an embedding;
   extracting, for each function, features from both of the corresponding intermediate representation and the embedding; and inputting, for each function, the corresponding extracted features into a machine learning model trained and configured to identify functions or components comprising cryptographic primitives;

determining a set of calls associated with each of the identified functions;

performing, based on the determined set of calls, a call site analysis to determine cryptographic algorithm parameters;

generating, based on the set of calls, the call site analysis, and a call graph characterizing relationships amongst different functions in the code, a cryptography bill of materials (CBOM) detailing cryptographic primitives within the software package; and providing the CBOM to a consuming application or process over a network to a remote computing system.

2. The method of claim 1, wherein the identification of functions comprises:

conducting a similarity analysis to identify statically linked cryptographic library functions in the code.

3. The method of claim 1, wherein the identification of functions comprises:

performing a cross-reference analysis to identify unique cryptographic primitives in the code.

4. The method of claim 3, wherein the identification of functions comprises:

performing a cross-reference analysis to detect statically linked cryptographic library functions.

5. The method of claim 4 further comprising:

generating the call graph characterizing relationships amongst different functions in the code; and identifying code relations on the call graph to collect all locations at which cryptographic code is used or called from.

6. The method of claim 1, wherein the identification of functions comprises:

analyzing protocol globally unique identifiers (GUIDs) indicative of cryptography-related Unified Extensible Firmware Interface (UEFI) protocols.

7. The method of claim 1, wherein the identification of functions comprises:

analyzing import sections of the code to identify dynamically linked functions.

8. The method of claim 1, wherein the dynamically linked functions are identified by way of indirect calls from exported functions to a third-party library which is dynamically linked during runtime.

9. The method of claim 1, wherein the algorithm parameters comprise one or more of: cipher modes, key sizes, parameter encoding, and parameter decoding.

10. The method of claim 1, wherein the call site analysis comprises:

generating a control flow graph;

performing control flow analysis on the control flow graph to identify specific modes of operation of a cipher.

11. The method of claim 1, wherein the call site analysis comprises:

emulating at least a portion of the code to identify specific modes of operation of a cipher.

12. The method of claim 1, wherein the call site analysis comprises:

emulating at least a portion of the code to reconstruct the cryptographic algorithm parameters.

13. The method of claim 1 further comprising:

initiating one or more remediation actions based on the CBOM.

14. The method of claim 13, wherein the initiated one or more remediation actions comprise:

blocking access to some or all of the software package.

15. The method of claim 13, wherein the initiated one or more remediation actions comprise: flagging one or more components within the software package as comprising cryptographic primitives.

16. A computer-implemented method comprising:

receiving a software package comprising components executing a plurality of functions;

generating, for each function a corresponding intermediate representation;

generating, for each intermediate representation, a corresponding embedding;

extracting features from each of the intermediate representations and the corresponding embedding;

determining, using at least one machine learning model and the extracted features, a set of calls associated with each of the identified functions;

performing, based on the determined set of calls, a call site analysis to determine cryptographic algorithm parameters by:

generating a call graph characterizing relationships amongst different functions in the code; and identifying code relations on the call graph to collect all locations at which cryptographic code is used or called from;

generating, based on the set of calls and the call site analysis, a cryptography bill of materials (CBOM) detailing cryptographic primitives within the software package; and providing the CBOM to a consuming application or process over a network to a remote computing system.

17. A computer-implemented method comprising:

receiving a software package comprising code;

identifying functions within the software package that implement or use cryptographic primitives by:

identifying linked cryptographic functions and unique cryptographic primitives;

performing a cross-reference analysis to detect statically linked cryptographic library functions;

analyzing protocol globally unique identifiers (GUIDs) indicative of cryptography-related Unified Extensible Firmware Interface (UEFI) protocols; and analyzing import sections of the code to identify dynamically linked functions, the dynamically linked functions being identified by way of indirect calls from exported functions to a third-party library which is dynamically linked during runtime;

determining a set of calls associated with each of the identified functions;

performing, based on the determined set of calls, a call site analysis to determine cryptographic algorithm parameters;

generating, based on the set of calls and the call site analysis, a cryptography bill of materials (CBOM) detailing cryptographic primitives within the software package; and providing the CBOM to a consuming application or process over a network to a remote computing system.

18. The method of claim 17, wherein the call site analysis comprises:

generating a control flow graph;

performing control flow analysis on the control flow graph to identify specific modes of operation of a cipher;

emulating at least a portion of the code to identify specific modes of operation of a cipher; and emulating at least a portion of the code to reconstruct the cryptographic algorithm parameters.

19. The method of claim 17, wherein the call site analysis comprises:

emulating at least a portion of the code to identify specific modes of operation of a cipher.

20. The method of claim 17, wherein the call site analysis comprises:

emulating at least a portion of the code to reconstruct the cryptographic algorithm parameters.

* * * * *